US012314571B1

(12) United States Patent
Ping et al.

(10) Patent No.: US 12,314,571 B1
(45) Date of Patent: May 27, 2025

(54) POWER-DIVERSE PLACEMENT FOR DATA REPLICAS AND AUTHORITY NODES IN NETWORK-BASED STORAGE

(71) Applicant: Amazon Technologies, Inc., Seattle, WA (US)

(72) Inventors: Fan Ping, Kenmore, WA (US); Sriram Venugopal, Issaquah, WA (US); Matthew Shawn Wilson, Bainbridge Island, WA (US); Anish Borkar, Cambridge, WA (US); John Michael Hayden, Mercer Island, WA (US); Divya Ashok Kumar Jain, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 18/064,184

(22) Filed: Dec. 9, 2022

(51) Int. Cl.
 *G06F 3/06* (2006.01)

(52) U.S. Cl.
 CPC .......... *G06F 3/0617* (2013.01); *G06F 3/0644* (2013.01); *G06F 3/0665* (2013.01); *G06F 3/067* (2013.01)

(58) Field of Classification Search
 CPC .... G06F 3/0617; G06F 3/0644; G06F 3/0665; G06F 3/067
 See application file for complete search history.

(56) References Cited

U.S. PATENT DOCUMENTS

| | | | | |
|---|---|---|---|---|
| 6,449,705 | B1* | 9/2002 | Peloquin | G06F 3/0644 711/216 |
| 9,641,615 | B1* | 5/2017 | Robins | G06F 3/0604 |
| 9,983,823 | B1* | 5/2018 | Mritunjai | G06F 3/0604 |
| 10,459,655 | B1* | 10/2019 | Greenwood | G06F 3/065 |
| 10,929,041 | B1* | 2/2021 | Ping | G06F 11/3034 |
| 10,990,464 | B1* | 4/2021 | Ping | G06F 3/0604 |
| 2013/0339295 | A1* | 12/2013 | Dean | G06F 3/0617 707/610 |
| 2015/0205531 | A1* | 7/2015 | DeMattio | G06F 3/065 711/114 |
| 2019/0332267 | A1* | 10/2019 | Muniswamy-Reddy | G06F 3/065 |

OTHER PUBLICATIONS

U.S. Appl. No. 17/338,532, filed Jun. 3, 2021.

* cited by examiner

*Primary Examiner* — Eric T Loonan
(74) *Attorney, Agent, or Firm* — Knobbe, Martens, Olson & Bear, LLP (57) ABSTRACT

Systems and methods are provided for hosting block storage volumes in a hosted computing environment that are supported by multiple underlying elements and that are distributed among physical host devices in a manner that provides for resiliency of the volumes in instances of power failure. As disclosed herein, a block storage volume may be supported by a combination of underlying elements, such as replicas that store data of the volume and replicated authority nodes that designate authority of a replica to accept writes to the volume. To ensure resiliency to power failure, both replicas and authority nodes can be distributed among physical host devices that are supplied by independent power supplies, such that failure of one independent power supply does not render the volume non-operational.

20 Claims, 6 Drawing Sheets

POWER-DIVERSE PLACEMENT FOR DATA REPLICAS AND AUTHORITY NODES IN NETWORK-BASED STORAGE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources. These virtual machines may carry out a wide variety of functionalities otherwise possible on a non-virtualized hardware device, such as invoking network-accessible services, conducting data processing, and the like.

DETAILED DESCRIPTION

Generally described, aspects of the present disclosure relate to ensuring resilient operation of hosted storage volumes by placing both replicas of data stored in the volumes and authority nodes for the volume in a power-diverse manner, such that complete or partial failure of a power supply to a subset of replicas and authority nodes for a hosted storage volume does not cause the hosted storage volume to fail. Specifically, as disclosed herein, a hosted storage volume may be implemented as two or more replicas, each replica providing an independent representation of data stored in the hosted storage volume (e.g., a distinct copy of the data). Writes to the volume may be replicated to each replica, such that if a single replica fails, the data of the volume remains accessible via the remaining replica. In addition, the volume may be associated with a set of authority nodes that associate the replicas with the volume. The authority nodes can further indicate one replica as a "primary" replica, providing the primary replica with authority to accept writes to the volume (which are then replicated to one or more other replicas) among other potential authorities (e.g., servicing reads to the volume). Failure of a sufficient number of either replicas or authority nodes may render the volume inoperable. For example, in some configurations a volume requires at least one replica and at least a majority of authority nodes to function. When a large number of host devices are available to store replicas and authority nodes, it can thus be beneficial to diversify placement of replicas and authority nodes to minimize chances that a given failure disables sufficient replicas and nodes to render the volume inoperable. Embodiments of the present disclosure address this problem with respect to a particular class of failure: failure of a power supply. Specifically, embodiments of the present disclosure provide for power-diverse placement of replicas and nodes corresponding to a volume, such that a complete or partial power failure with respect to a subset of replicas or nodes does not result in failure of the volume.

Moreover, embodiments of the present disclosure provide for complex placement determinations accounting for power-diverse placement and other placement criteria, including diversity in other failure domains. For example, embodiments of the present disclosure can provide for placement of replicas and authority nodes from a volume among multiple possible placements to provide for diversity across power, networking, and physical damage domains. Still further, embodiments of the present disclosure can provide for placement of replicas and nodes of a storage volume accounting for both diversity and consolidation parameters. Specifically, while diversification of placement can provide for resiliency in the case of failures, consolidation of replicas and nodes may increase performance of a volume. For example, co-locating replicas on a single storage system may reduce latency of communications between replicas, improving performance. Thus, goals of diversification and consolidation of replicas can at times be at odds with one another. Embodiments of the present disclosure address this issue by providing for placement of a replicated storage volume (e.g., of replicas and authority nodes for the volume) across multiple failure domains while consolidating such placement to maintain acceptable performance of the volume.

As will be appreciated by one of skill in the art in light of the present disclosure, the embodiments disclosed herein improve the ability of computing systems, such as block storage services, to provide resilient hosted storage volumes that are supported by multiple supporting elements (e.g., both replicas and authority nodes). Moreover, the presently disclosed embodiments address technical problems inherent within computing systems; specifically, the difficulty of providing complex hosted systems (e.g., reliant on multiple underlying elements) that are resilient to power failures, and the difficulty of placing underlying elements within host servers such that this resilience is achieved. These technical problems are addressed by the various technical solutions described herein, including a placement service configured to select a placement of multiple supporting elements of a hosted storage volume to ensure powerline diversity among such elements and thus resiliency of the volume to power failures. Thus, the present disclosure represents an improvement in host devices and computing systems in general.

While example embodiments are discussed herein with reference to block storage devices and replicated authority nodes, other embodiments of the present disclosure may relate to other distributed systems. Illustratively, replicas of a block storage volume may be viewed as members of a group corresponding to that volume, while replicated storage nodes may be viewed as instances storing metadata regarding that group—e.g., the members of the group and an individual member designated as primary within the group. Embodiments of the present disclosure may additionally or alternatively relate to other distributed systems that implement other types of group members and/or other types of metadata. Accordingly, examples relating to replicas of a block storage volume—one example of group members—may be modified to relate to other example group members, such as other types of data replicas (e.g., of a database, object store, key-value store, or the like) or service endpoints (e.g., a computing device providing a given functionality via a network). Similarly, examples relating to replicated authority nodes—example stores of metadata regarding a group—may be modified to relate to other stores of metadata or types of metadata, such as access lists, membership lists, permissions data, or the like. Unless otherwise indicated to the contrary, it should be understood that description of embodiments relating to replicas and replicated authority notes may be modified to apply to such other group members and metadata stores.

The foregoing aspects and many of the attendant advantages of this disclosure will become more readily appreciated as the same become better understood by reference to the following description, when taken in conjunction with the accompanying drawings.

Figure 1:
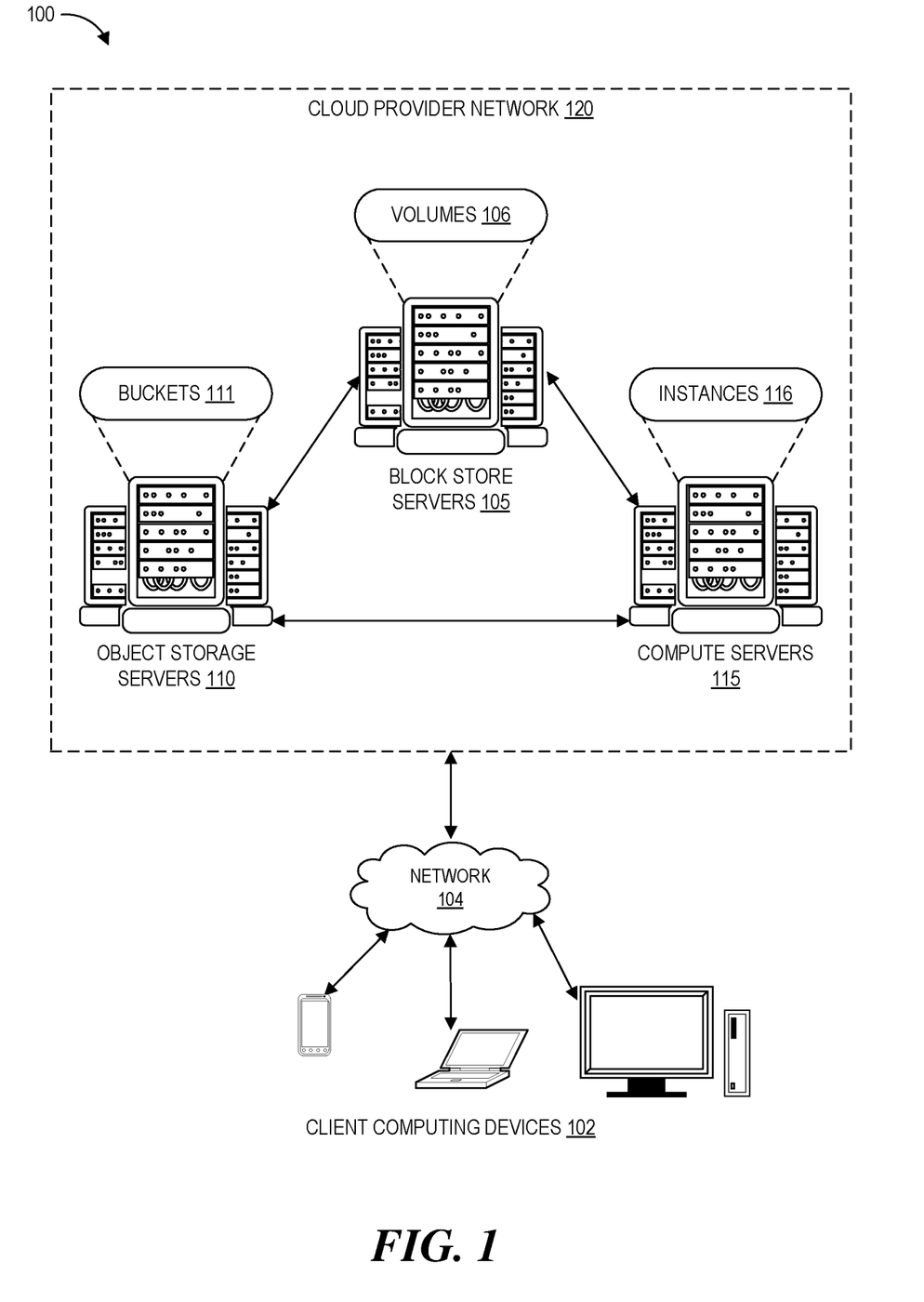
FIG. 1 depicts an example computing environment including a cloud provider network in which embodiments of the present disclosure can be implemented.

FIG. 1 depicts an example computing environment 100 including a cloud provider network 120 in which embodiments of the present disclosure can be implemented. Specifically, embodiments of the present disclosure provide for diverse placement of volumes 106 among block store services 105 of a cloud provider network 120, as further discussed below.

The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, servers providing serverless computing services, and other server services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data may be lost.

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 106 may be encrypted or unencrypted. Network-accessible block-storage devices may in some cases be end-user-accessible, for example by acting as a virtual disk drive for a virtual machine instance. In other instances, network-accessible block-storage devices may not be end-user accessible, but may be used to provide services to end users. For example, one or more network-accessible block-storage devices may be used as non-accessible recovery devices, supporting recovery to end-user-accessible block-storage devices.

The block store servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 KB, 256 kB, 512 kB, or larger, depending upon the implementation.

Volumes 106, which can be treated as an individual storage drive ranging for example from 1 GB to 100 terabytes TB (or more) in size, are made of one or more blocks stored on the block store servers 105. Although treated as an individual storage drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. The block store servers 105 may have built-in redundancy for volumes 106 by replicating the volume across multiple servers within an availability zone, which means that volumes 106 will not fail if an individual server fails or some other single failure occurs. As discussed below, replicas of a volume 106 may be supported by authority nodes that designate status of the replica amongst multiple replicas of the volume 106, such as by designating a single replica as a "primary" replica with authority to accept writes to the volumes. In accordance with embodiments of the present disclosure, replicas and authority nodes for a volume 106 may be placed among block store servers 105 to in a power-diverse manner, such that a failure of a power source for a subset of replicas or authority nodes does not cause failure of the volume.

Each volume may be "attached" to an instance 116 running on a compute server 115, and can be detached from that instance 116 and re-attached to another. Attachment between a volume and an instance refers to the establishment of a connection between the instance—or other software or hardware acting on behalf of the instance—and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by code executed within a secure compute layer of compute servers 115, discussed in further detail below.

The object storage servers 110 represent a distinct type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol like SATA (though potentially encapsulated over a network), interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

Block store servers 105, object store servers 110, and compute servers 115 may be distinct physical computing devices. For example, the cloud provider network 120 may utilize one set of physical servers to implement block store servers 105, another to implement compute servers 115, etc. These devices may have the same architecture (e.g., the same processor, memory, and storage configuration among both block store servers 105 and compute servers 115) or different architectures (e.g., a different processor, memory, or storage among block store servers 105 and compute servers 115. In another embodiment, the cloud provider network 120 utilizes one or more common servers to implement two or more of block store servers 105, object store servers 110, and compute servers 115. Thus, a given physical server may act as, for example, both a block store server 105 and a compute server 115.

Figure 2:
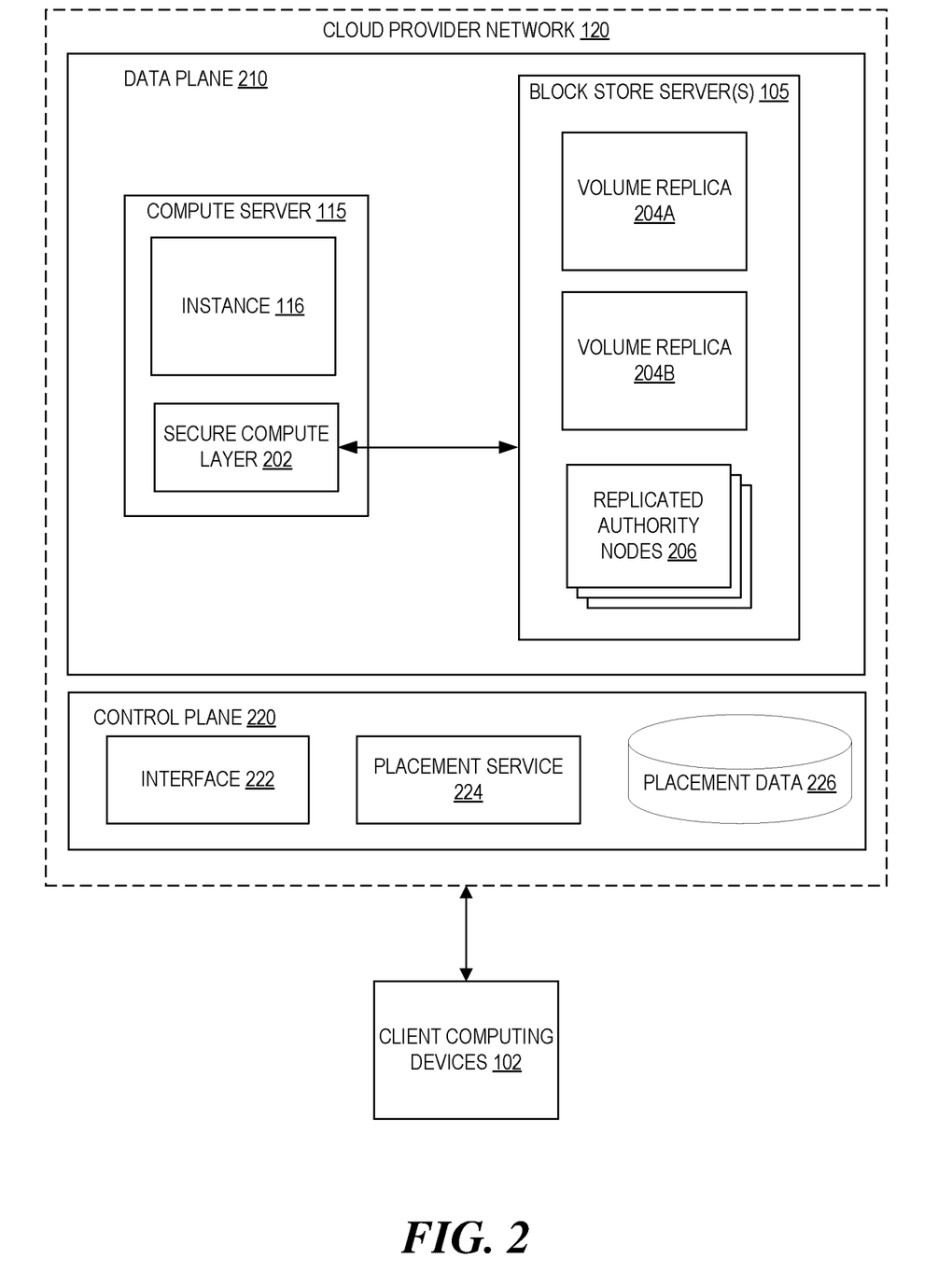
FIG. 2 provides a logical view of how elements of the cloud provider network of FIG. 1 may be arranged to provide for network-accessible block storage volumes that are placed among block store servers in a power-diverse manner.

FIG. 2 provides a logical view of how elements of the cloud provider network 120 of FIG. 1 may be arranged to provide for network-accessible block storage volumes 106 that are placed among block store servers 105 in a power-diverse manner.

In FIG. 2, the functionality of the cloud provider network 120 is logically subdivided into two categories: control plane functionality implemented in a logical control plane 220 and data plane functionality implemented in a logical data plane 210. While the data plane 210 supports movement of user data through the cloud provider network 120, the control plane 220 supports movement of control signals through the cloud provider network 120. The control plane 220 generally includes one or more control plane components distributed across and implemented by one or more control servers, such as servers 303, 305, and 307 discussed below with respect to FIG. 3. In one embodiment, control servers are distinct from servers implementing the data plane 210. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources.

Specifically, in FIG. 2, the data plane 210 includes an illustrative compute server 115 hosting a user instance 116. As discussed above, the instance is illustratively a compute environment (e.g., including an operating system, libraries, etc.) defined by and hosted on behalf of a user. The environment may for example be a virtual machine, or may be a non-virtualized (e.g., "bare metal") environment. In FIG. 2, the compute server 115 provide primarily processing or computational resources, such as processing power and high-speed (e.g., random access) memory. While the compute server 115 may provide some persistent storage to the instance 116, the compute server 115 may be configured to interact with the block store servers 105 to provide additional persistent storage to the instance 116 in the form of a block storage volume. Specifically, in FIG. 2, the compute server 115 includes a secure compute layer 202 configured to present a network-accessible block storage volume as a local storage device. For example, the secure compute layer may be implemented by compute resources (e.g., a processor, memory, storage, etc.) that are logically isolated from the instance 116, and that are configured to present a virtualized local block storage device to the instance 116 and act as a "middleman" between input/output (I/O) operations to the virtualized local block storage device and network operations to or from the block store servers 105. Illustratively, the secure compute layer 202 may accept I/O operations via local mass storage protocol (e.g., serial ATA, "SATA"), encapsulate the operations into network packets, and forward the packets to the block store servers 105 for implementation. Similarly, the secure compute layer 202 may accept responses form block store servers 105 over a network and return corresponding (e.g., decapsulated) responses to the instance 116. Thus, block store servers 105 can host a block storage volume that is accessible to the instance 116 in a manner similar to or the same as a local storage device.

A given storage volume at the block store servers 105 can be implemented by multiple underlying elements. Specifically, as shown in FIG. 2, an individual block storage volume can be implemented by at least two volume replicas 201A and B, each of which represents an independent copy of data store within the volume. By providing redundant copies of the data of the volume, a volume can be made resilient to failure of an individual replica 204. For example, should replica 204A fail, the volume may be supported by operation of replica 204B. Illustratively, replica 204B may accept I/O operations for the volume and support generation of a new replica 204 to replace failed replica 204A.

Volumes may further be implemented using a set of replicated authority nodes 206. In FIG. 2, the replicated authority nodes 206 can be configured to designate which replica 204 has authority as a primary replica 204 of a given block storage volume. For example, a primary replica 204 may be considered authoritative when resolving conflicting data among different replicas 204. In some configurations, a primary replica 204 may be solely authorized to receive writes for a volume, reads of a volume, or both. Illustratively, prior to attaching a volume to an instance, the secure compute layer 202 may communicate with replicated authority nodes 206 to identify an individual volume replica 204 that is designated by the nodes 206 as a primary replica 204 for the volume. Additionally or alternatively, prior to accepting an attachment to an instance, a given replica 204 may communicate with the replicated authority nodes 206 to verify its status as primary replica 204 for the volume. Illustratively, each replica node 206 implements a database of key-value pairs that associates a given volume (e.g., identified via a unique volume identifier) with a given set of replicas 204. In one embodiment, interactions with the replicated authority nodes 206 utilize a quorum protocol, such that a response from a quorum (such as a bare majority) of nodes 206 is accepted as an authoritative response of the nodes 206. Accordingly, the block store servers 105 may implement an odd number of nodes 206 for each volume, such as 3 nodes 206, 5 nodes 206, or 7 nodes 206. The nodes 206 and replicas 204 may be configured to interact to ensure that, at any given time, at least one replica 204 is designated as primary for a given volume (even if no other replicas 204 are operational). A given block storage volume may thus be viewed as a logical association of two or more replicas 204 and a set of replicated authority nodes 206. Moreover, operation of the volume may rely on at least a minimum number of replicas 204 and nodes 206, such as at least one replica 204 and at least a half of the nodes 206. Put in other terms, each volume can be associated with a maximum number of failed replicas 204 and nodes 206 to remain operational, such that if more than the maximum number of replicas 204 or more than the maximum number of nodes 206 fails, the volume fails.

In accordance with embodiments of the present disclosure, the cloud provider network 120 can be configured to place replicas 204 and nodes 206 among block store servers 105 in a manner than minimizes probability of failure due to one or more failure types. Specifically, the cloud provider network 120 can be configured to place replicas 204 and nodes 206 among block store servers 105 in a power-diverse manner: that is, a manner that ensures that no single power source failure (or n number of power source failures, where further redundancy is desired) would result in lack of power to more than the maximum number of failed replicas 204 and nodes 206 a volume requires to remain operational.

To facilitate such placement, the control plane 220 of the cloud provider network 120 includes a placement service 224 representing a computing device configured to make placement determinations for replicas 204 and nodes 206 such that the replicas and nodes 206 are power diverse. Example interactions and routines for making power-diverse placement determinations are discussed in more detail below. However, in brief, the placement service 224 may utilize power supply data store in a placement data store 226 that, for example, reflects a physical configuration of power sources and servers in a data center, and may respond to requests for placement decisions of replicas 204 and nodes 206 by placing such replicas 204 and nodes 206 in a power-diverse manner. In some embodiments, the placement service 224 may determine placement according to other criteria, including but not limited to other diversity criteria (e.g., diversity of physical hardware, networking equipment, or the like) and performance criteria (e.g., a maximum network distance between two or more of replicas 204, nodes 206, and instances 116, a maximum load on block store servers 105, an available storage capacity of block store servers 105, etc.).

In one embodiment, the placement service 224 makes placement determinations responsive to requests from an interface 222. For example, a client computing device 102 may interact with the cloud provider network 120 via the interface 222, which represents a graphical user interface (GUI), command line interface (CLI), application programming interface (API) or the like, to request creation of a block storage volume. The interface 222 may thus request a placement determination from the placement service 224, indicating particular block store servers 105 on which to implement replicas 204 and nodes 206. The interface 222 can then instruct the particular block store servers 105 to implement such replicas 204 and nodes 206, thus creating the requested block storage volume.

The interface 222 and placement service 224 are illustratively implemented by one or more computing devices (e.g., a server 303, 305, or 307 as discussed below) that are distinct from (though potentially of the same architecture or configuration as) compute servers 115 and block store servers 105. For example, the cloud provider network 120 can include one or more computing devices configured to implement the control plane 220 that are independent from any computing devices implementing the data plane 210. The placement data store 226 illustratively represents any persistent storage accessible to such computing devices, including solid state drives (SSD), hard disk drives (HDDs), network-attached storage, or the like. For example, the placement data 226 can be implemented as a computing device storing a database accessible to the control plane 220.

Figure 3:
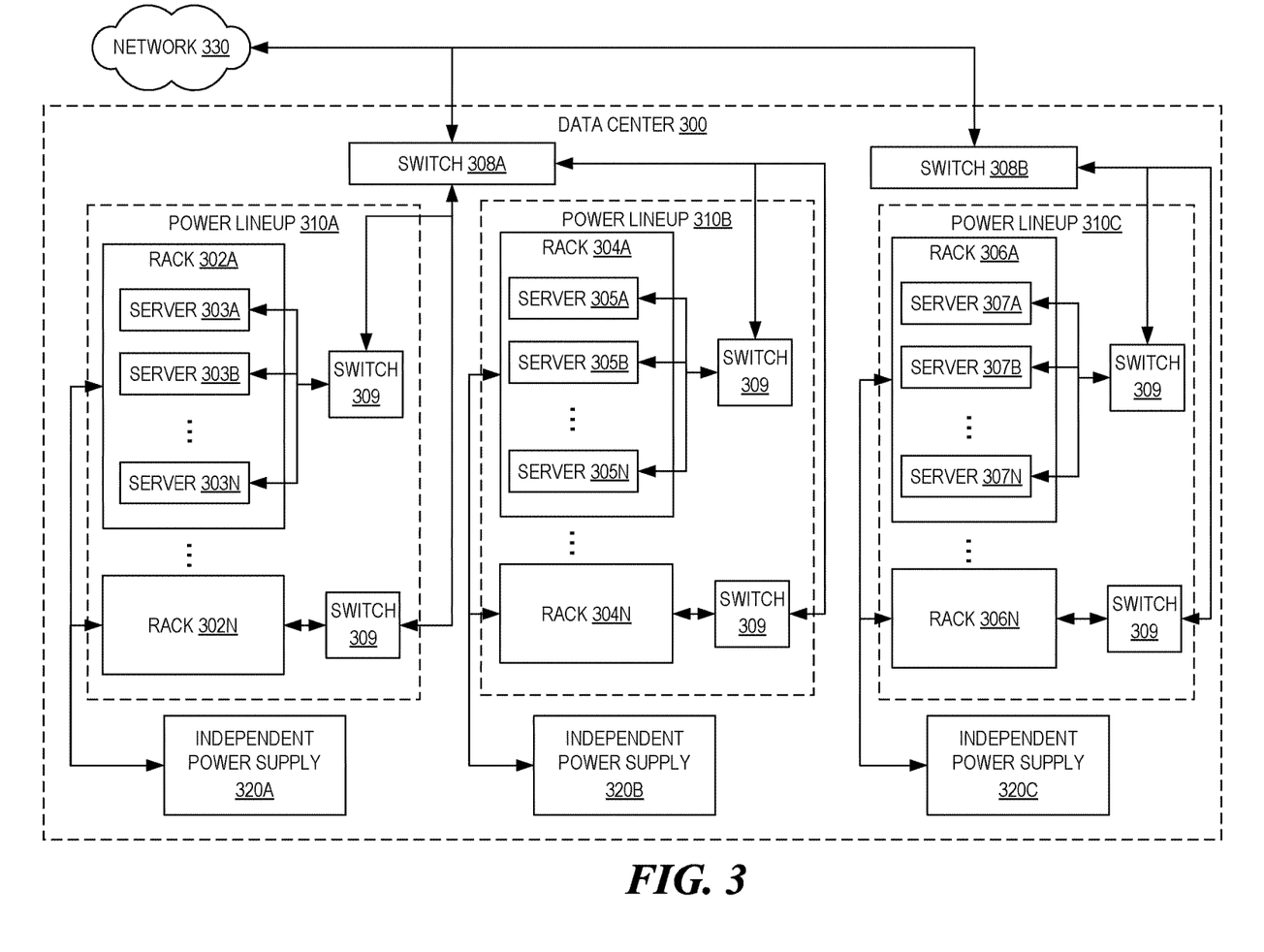
FIG. 3 depicts one example configuration of a data center supporting operations of the cloud provider network of FIG. 1.

With reference to FIG. 3, one example configuration of a data center 300 supporting operations of the cloud provider network 120 will be described. Specifically, FIG. 3 depicts an example configuration of a data center 300 with multiple independent power supplies 320 (shown as supplies 320A-C), such that replicas 204 and nodes 206 can be distributed among servers connected to such supplies 320 in a manner that ensures that any single power source failure (or multiple failures) does not result in lack of power to more than the maximum number of failed replicas 204 and nodes 206 a volume requires to remain operational.

The data center 300 illustratively corresponds to a single physical location. For example, the data center 300 may corresponding to a single building, or portion thereof. As shown in FIG. 3, the data center 300 includes a plurality of racks 302A-N, 304A-N, and 306A-N, each of which represents any number of racks. Each rack illustratively represents a physical rack of corresponding servers, shown in FIG. 3 as servers 303A-N, servers 305A-N, and servers 307A-N, each of which represents any number of servers. Each server 303, 305, and 307 illustratively represents computing hardware (e.g., processors, memory, persistent storage, etc.) capable of being configured to act as one or more of block store servers 105, object storage servers 110, compute servers 115, or servers implementing functionality of the control plane 220. Accordingly, by configuration of servers, the cloud provider network 120 can implement functionalities described above with respect to FIGS. 1 and 2. While FIG. 3 refers to server 303, 305, and 307 using different reference numerals for ease of reference, two or more of server 303, 305, and 307 may share a physical configuration. Additionally or alternatively, configurations may vary among individual servers within each set of server 303, 305, and 307.

In general, each server 303, 305, and 307 provides independent compute resources (e.g., processing capacity, memory capacity, persistent storage capacity, etc.), such that no single failure of compute resources is expected to impair the compute resources of another server 303, 305, and 307. However, in a data center 300, two or more servers 303, 305, and 307 may be collectively reliant on another resource, including networking resources and power resources.

For example, in FIG. 3, each rack 302, 304, or 306 is associated with a corresponding network switch 309 (a "top of rack" switch or a "TOR") that provides network access between the servers of the rack. Each switch 309 is in-turn connected to a higher-layer (in turns of network topology) switch 308A. Thus, servers of a given rack (e.g., servers 303A and 303B of rack 302A) may communicate with one another via a TOR switch 309, while servers of different racks connected to the same higher-layer switch 308 may communicate with one another via their respective TOR switches 309 and that higher-layer switch 308. Still further, a given data center 300 may include multiple higher-layer switches 308A in communication with one another and with an external network 330. For example, the network 330 may connect one data center 300 to another data center 300 and provide access to a WAN or GAN such as the Internet. Because a volume may be intended for access via the network 330, each switch (e.g., switch 308 or 309) shared servers may represent a shared point-of-failure for the servers. To avoid creating a single point-of-failure, each switch (e.g., switch 308 or 309) may include internal redundancy. For example, each switch (e.g., switch 308 or 309) may be implemented by at least two physical switches and be configured to failover from one physical switch to another in case of failure. In one embodiment, the topology of FIG. 3 is a simplified representation of a fat tree (also known as a "folded Clos") network topology. For example, each switch 308 in FIG. 3 may represent two or more levels of interconnected switches (e.g., providing full bisectional bandwidth across each pair of ports), while an additional layer of switches (not shown in FIG. 3) act as "spines" connecting switches 308. While FIG. 3 depicts one example network topology (e.g., in a tree), others are possible. Such a topology may include a different number of levels, a different layout, may utilize different networking components (e.g., bridges, routers, etc.), or the like.

In addition to networking resources, servers within the data center 300 can share access to power resources. Specifically, in FIG. 3, the data center 300 includes three power lineups 310, shown as lineups 310A, 310B, and 310C. While three lineups 310 are shown in FIG. 3, other numbers of lineups are possible. In FIG. 3, each lineup 310 corresponds to a given independent power supply 320. That is, lineup 310A corresponds to independent power supply 320A, lineup 310B corresponds to independent power supply 320B, etc. Each independent power supply 320, in turn, represents a power supply that is at least partly independent of the power sources of another independent power supply 320. For example, each independent power supply 320 may represent a distinct power generator, battery backup, uninterruptable power supply (UPS) or the like. In some cases, multiple independent power supplies 320 share at least a portion of their respective power sources. For example, each supply 320 may in non-failure conditions obtain power from one or more common sources, such as a municipal power source. However, despite sharing at least a portion of their respective power sources, each supply 320 is independent in that the supply 320 can alternatively supply power from a source (e.g., a generator, battery, or UPS) that is not shared between independent power supplies 320. Accordingly, failure of an individual independent power supply 320 or a power source of that power supply 320 is not expected to correlate with other independent power supplies 320.

In one embodiment, elements of FIG. 3 (e.g., each server 303, network device, independent power supply 320, etc.) include monitoring components configured to monitor a state of the element and report that state to the placement data store 226 (which may be implemented by a set of servers in the data center 300, servers accessible via the network 330, etc.). The state may include, for example, an operational state of the element (e.g., as operational or non-operational) and a load on the element (e.g., as one or more load metrics). As discussed herein, state of individual elements may be utilized by a placement service 224 to facilitate power diverse placement of elements implementing a block storage device.

In accordance with embodiments of the present disclosure, power-diverse placement of a storage volume may be ensured by dividing elements supporting the volume (e.g., replicas 204 and nodes 206) among servers in different power lineups 310, such that failure of a single lineup 310 (e.g., due to failure of a single power supply 320) does not result in non-operability of the volume. For example, the at least two replicas 204 of a volume can be placed among servers in at least two different lineups 310, while nodes 206 of the volume can be placed among servers in at least three different lineups 310, with no lineup 310 supporting sufficient nodes 206 to prevent a quorum from forming based on nodes 206 on other lineups 310 (e.g., with each lineup 310 supporting less than half of all nodes 206 where a quorum is a bare majority). In this manner, failure of a single lineup 310 would not result in the volume becoming non-operational, because any single lineup 310 would not result in less than a minimum number of replicas 204 and nodes 206 being accessible.

In some embodiments, placement of elements supporting a volume may include further redundancy or performance requirements. For example, placement may require that replicas 204 of a volume not share a single server or rack, or that replicas 204 are not more than a given network distance (e.g., in terms of network hops, latency, etc.) from one another. As an illustration, placements may require that replicas 204 share a given higher-level switch 308 in a data center 300 (e.g., and thus be no more than 3 hops network distance from one another and avoid communication across a "spine" connecting different switches 308) to ensure speed of communication between replicas 204. Still further, placement may be based at least in part on available storage capacity of individual servers 303 or other load metrics, such as available processing capacity, power capacity, or the like. Illustratively, placement may be based at least in part on power load of an individual lineup 310, as disclosed in U.S. patent application Ser. No. 17/338,532 entitled "POWER AWARE LOAD PLACEMENT FOR SUB-LINEUPS" and filed Jun. 3, 2021, the entirety of which is hereby incorporated by reference. In one example, a placement service 224 makes a placement decision by balancing or weighting multiple placement factors (e.g., redundancy or performance requirements). For example, each factor may be set as "required" or "best effort," such that the placement service 224 determines a placement that satisfies all required factors while making a best effort to meet best effort factors.

Figure 4:
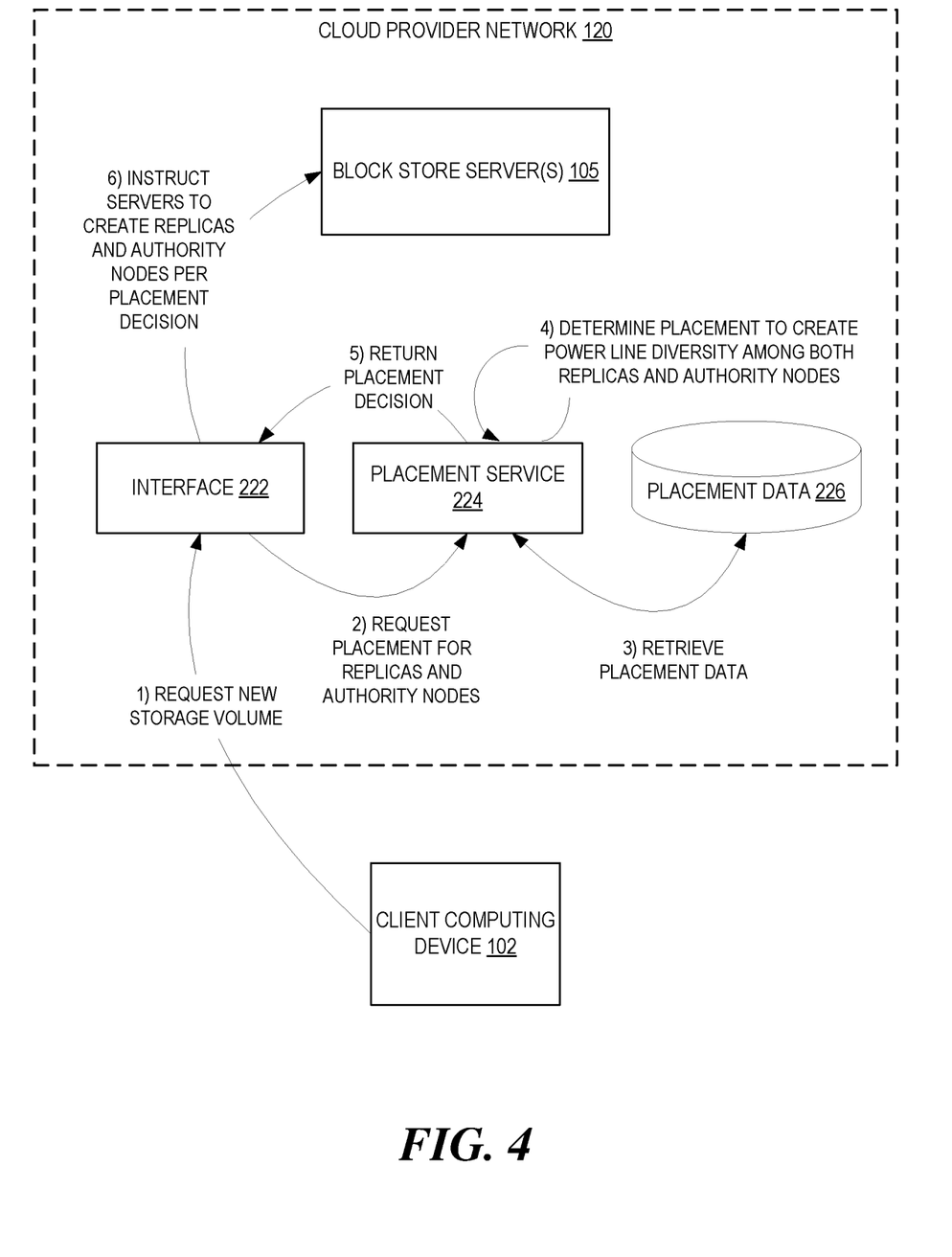
FIG. 4 depicts illustrative interactions for placing elements of a block storage volume, including replicas and replicated authority nodes, among servers in a data center to provide for power diversity among the element of the block storage volume.

With reference to FIG. 4, illustrative interactions will be described for placing elements of a block storage volume, including replicas 204 and replicated authority nodes 206, among servers in a data center 300 to provide for power diversity among the element of the block storage volume. The interactions of FIG. 4 are provided as an example of interactions to place a new storage volume (e.g., with a new set of replicas 204 and nodes 206); however, similar interactions may be used to place a single element of a new storage volume (e.g., a single new replica 204 to replace a failed replica 204) for example by holding placement of existing elements constant while determining the placement of the single element.

The interactions of FIG. 4 begin at (1), where a client computing device 102 transmits to the interface 222 a request for a new storage volume. For example, the client computing device 102 may previously interacted with the interface 222 to create an instance 116, and may thus request creation of a new storage volume to provide or expand block storage of the instance 116. The request can include operational parameters of the volume, such as a volume type (e.g., a hard disk drive, solid state drive, etc.), performance parameters (e.g., desired I/O operations per second, or IOPS, supported, desired read or write speeds, etc.), volume size (e.g., in bytes or multiples thereof), or the like. At (2), the interface 222 in turn transmits to the placement service 224 a request for placement of replicas 204 and authority nodes 206 for the volume. The interface 222 illustratively passes to the placement service 224 the requested operational parameters.

At (3), the placement service retrieves placement data from the placement data store 226. As discussed above, placement data can include various operational data regarding one or more data centers, such as data center 300 of FIG. 3. For example, placement data can include a physical configuration of data centers, such as an association of each server to a particular top-of-rack switch 309, higher-level switch 308, and independent power supply 320. Placement data can further include load or performance information of servers, such as an available or used storage capacity of servers, available or used processing capacity of servers, available or used network bandwidth of servers, or the like.

At (4), the placement service 224 determines placement of replicas 204 and nodes 206 among servers in a data center to create powerline diversity amongst both replicas 204 and nodes 206. As noted above, powerline diversity can include that no failure of n independent power supplies 320 (where n is one or more) renders a volume inaccessible. For example, where a volume requires at least one replica 204 and at least a majority of nodes 206, a single powerline diverse placement (e.g., n of 1) can include ensuring that replicas 204 are divided amongst servers served by at least two independent power supplies 320 (such that failure of any single independent power supplies 320 would not impair operation of at least one replica 204) and that nodes 206 are divided amongst servers served by at least three independent power supplies 320, with no individual power supply 320 supporting operation of half or more of nodes 206 (such that failure of any individual power supply 320 cannot impair operation of that majority of nodes 206). As another example, where a volume requires at least one replica 204 and at least a majority of nodes 206, double powerline diverse placement (e.g., n of 2) can include ensuring that replicas 204 are divided amongst servers served by at least three independent power supplies 320 (such that failure of any two independent power supplies 320 would not impair operation of at least one replica 204) and that nodes 206 are divided amongst servers served by at least five independent power supplies 320, with no two power supplies 320 supporting operation of half or more of nodes 206 (such that failure of two individual power supplies 320 cannot impair operation of that majority of nodes 206). In some instances, replicas 204 and nodes 206 may be grouped together on a given power lineup 310 supplied by a given power supply 320. For example, where replicas 204 are distributed across two lineups 310, nodes 206 may also be distributed across the two lineups 310 as well as an additional lineup 310. This can provide for "fate sharing" among replicas 204 and nodes 206, given that both replicas 204 and nodes 206 can be required for a volume to function. That is, there may be no need to distribute nodes 206 to different lineups 310 than replicas 204, because if all replicas 204 fail then the volume would be inaccessible, regardless of the operability of nodes 206. In other instances, replicas 204 and nodes 206 can be distributed across different lineups 310 (e.g., with no overlap in the lineups 310 servicing the respective replicas 204 and nodes 206). In either configuration, powerline diversity provides for resilient operation of a volume in cases of power failures.

In some instances, the placement service 224 applies additional logic in determining a placement of replicas 204 and nodes 206. For example, the placement service 224 may be configured with a set of constraints and optimization parameters for placement of replicas 204 and nodes 206, and attempt to place replicas 204 and nodes 206 among servers in a data center 300 (or potentially across data centers 300) while satisfying the constraints and optimizing the optimization parameters. Some constraints may be designated as "hard" constraints, such that if a placement satisfying the hard constraints cannot be made, placement fails. Other constraints may be designated as "soft" constraints, such that the placement service 224 makes a best effort to satisfy the constraints. As an illustration, the placement service 224 may be configured to place replicas 204 no more than a certain network distance away from one another (e.g., a maximum hop of 3, which may correspond to being connected to the same "grandparent" network node in a network tree topology). This network distance constraint may be a hard or a soft constraint. Conversely, the placement service 224 may be configured (as a hard or soft constraint) not to place replicas 204 within a single hop of one another, to avoid possibilities of network partitions or other network problems rendering the replicas 204 collectively inaccessible. As another illustration, the placement service 224 may be configured not to place replicas 204 on the same server or same rack (e.g., as a hard or soft constraint). As yet another illustration, the placement service 224 may be configured (as a hard or soft constraint) to place replicas 204 on a server with sufficient amount or type of computing resources (e.g., processing resources, memory resources, persistent storage resources, or combinations thereof) to host the replica 204 (e.g., such that when placed, the server load on a given computational resource does not exceed a threshold value; or such that the servers on which the replica 204 is placed can satisfy requested performance criteria of the replica 204). If multiple placements that satisfy constraints exist, the placement service 224 may select from among the multiple placements according to optimization parameters, such as minimizing network distance among replicas 204, nodes 206, or combinations thereof or balancing load among servers, power supplies 320, network devices, etc. Similar logic may be applied to placement of nodes 206 as a set, or placement of replicas 204 and nodes 206 collectively.

In each of the above examples, constraints or optimization parameters may take into account a current operational status of a resource. For example, the placement service 224 may be configured to place elements of a storage volume only on fully operational servers.

At (5), after determining a placement for replicas 204 and nodes 206 that provides for powerline diversity (and potentially satisfies other constraints and optimizes a given optimization parameter), the placement service 224 returns the placement decision to the interface 222. Illustratively, the placement decision identifies individual servers from among the block store servers 105 (each of which can correspond to a server in a data center 300 of FIG. 3) to host each replica 204 and node 206 supporting a volume. At (6), the interface 222 then instructs the block store servers 105 to host the replicas 204 and nodes 206. In some instances, hosting may include generating replicas 204 and nodes 206. In other instances, hosting may include modifying existing replicas 204 and nodes 206 to support an additional volume. For example, where nodes 206 are multi-tenanted (and thus store data for multiple volumes), hosting may include modifying a given node 206 to store authority data for a new volume).

While not shown in FIG. 4, the interface 222 may further return a confirmation to the client computing device 102 that the volume is being created. In some instances, the block store servers 105 may notify the interface 222 when hosting of replicas 204 and nodes 206 is complete, and the interface 222 may further return a confirmation to the client computing device 102 that the volume available for use. Thereafter, the client computing device 102 may interact with the volume (e.g., directly or via use of an instance 116) to access persistent block storage.

Figure 5:
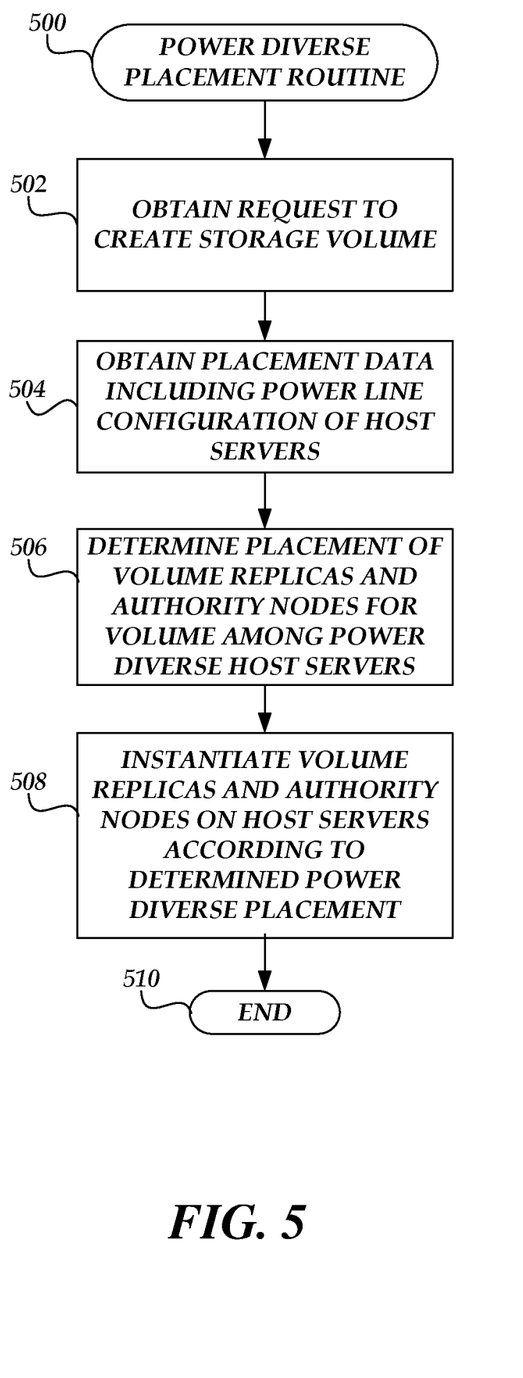
FIG. 5 depicts an illustrative routine for power diverse placement of a storage volume in a data center.

With reference to FIG. 5, an illustrative routine 500 will be described for power diverse placement of a storage volume in a data center. The routine 500 is illustratively implemented by the placement service 224 of FIG. 2.

The routine 500 begins at block 502, where the placement service 224 obtains a request to create a storage volume. As noted above, the storage volume may be a logical object in a cloud provider network 120 that is supported by underlying objects including replicas 204 of data stored in the storage volume and replicated authority nodes 206 that designate a replica as primary for purposes such as disambiguating data between replicas 204, servicing reads to the volume, or accepting writes to the volume. The request illustratively includes parameters for the volume, such as performance requirements, volume size, a data center (or collection thereof, which may constitute an availability zone, a region, etc.) in which to place the volume, or the like.

At block 504, the placement service 224 obtains placement data including a powerline configuration of potential host servers, among other possible information. Illustratively, the placement data can include a listing of servers available to host replicas 204 and a listing of servers available to host authority nodes 206. The placement data can further include a particular independent power supply associated with each server, such that the placement service 224 can determine a power-diverse placement of replicas 204 and nodes 206. In addition, the placement data can include additional information that may be used to determine such placement, including a particular placement of each host server in a network topology (e.g., a particular network location of the server or associated group of network elements including the server), physical placement of each host server (e.g., a physical location of the server, such as rack including the server, a data center of the server, etc.), or current status of the server or resources associated with the server (e.g., current use of computing resources of the server, current use of network bandwidth by the server or other related network elements, current power load of a power supply supplying power to the server, etc.).

At block 506, the placement service 224 determines a placement of replicas 204 and nodes 206 among the servers that provides for power diversity. As noted above, power diversity can be characterized by a placement that ensures that no failure of n independent power supplies 320 (where n is one or more) renders a volume inaccessible. Because a volume can require at least one replica 204 and at least a quorum of authority nodes 206 to be accessible, power diversity characterized by a placement that ensures that no failure of n independent power supplies 320 renders inaccessible all replicas 204 and sufficient authority nodes 206 to prevent formation of a quorum. For example, where a volume requires at least one replica 204 and at least a majority of nodes 206, a single powerline diverse placement (e.g., n of 1) can include ensuring that replicas 204 are divided amongst servers served by at least two independent power supplies 320 (such that failure of any single independent power supplies 320 would not impair operation of at least one replica 204) and that nodes 206 are divided amongst servers served by at least three independent power supplies 320, with no individual power supply 320 supporting operation of half or more of nodes 206 (such that failure of any individual power supply 320 cannot impair operation of that majority of nodes 206). As another example, where a volume requires at least one replica 204 and at least a majority of nodes 206, double powerline diverse placement (e.g., n of 2) can include ensuring that replicas 204 are divided amongst servers served by at least three independent power supplies 320 (such that failure of any two independent power supplies 320 would not impair operation of at least one replica 204) and that nodes 206 are divided amongst servers served by at least five independent power supplies 320, with no two power supplies 320 supporting operation of half or more of nodes 206 (such that failure of two individual power supplies 320 cannot impair operation of that majority of nodes 206). As noted above, the distribution of replicas 204 and nodes 206 among servers may be overlapping (e.g., such that an individual replica 204 shares a host server with an individual node 206) or non-overlapping). In either configuration, powerline diversity provides for resilient operation of a volume in cases of power failures.

As discussed above, the placement service 224 can determine a placement based on additional or alternative criteria. For example, the placement service 224 in one embodiment determines a placement of replicas 204 and nodes 206 among the servers that ensures that no two replicas 204 or nodes 206 are co-located on the same rack and that no two replicas 204 or nodes 206 are more than a given network distance apart (e.g., in terms of hop count, traversal of particular elements of a network topology, etc.). The placement server 224 can be configured to consider each constraint as either a hard constraint that must be met or a soft constraint that is met if possible. When multiple placements exist that satisfy all constraints, the placement service 224 can apply optimization parameters to select from among possible placements. For example, the placement service 224 may select a least loaded set of servers to host replicas 204 and nodes 206.

While described in terms of placement of individual replicas 204 and nodes 206, in some embodiments either or both replicas 204 and nodes 206 may be subdivided into further elements or constituent parts. For example, rather than storing a replica 204 on a single host server, a replica 204 may be partitioned a number of times (e.g., 2, 4, 8, 16 or more times) and distributed among multiple host servers (e.g., with each partition of the replica 204 hosted on one of the multiple host servers). In such a configuration, the placement service 224 can consider a given element as "placed" on all of the multiple host services for purposes of powerline diversity or other constraints. For example, where a first replica 204 is hosted among servers spanning two independent power supplies 320, a second replica 204 would not be power diverse with respect to the first replica if hosted on servers supported by either independent power supply 320 (as failure of either independent power supply 320 would be expected to cause failure in both some partition of the first replica and any supported portion of the second replica 204). Additionally or alternatively, the placement service 224 may operate on a partition-by-partition basis, such that replicas 204 are considered as multiple distinct sub-replicas (each corresponding to a given partition), and any given pair of replicas 204 (e.g., replicating the same portion of a volume) must be placed to satisfy all constraints.

At block 508, the placement service 224 causes volume replicas 204 and authority nodes 206 to be instantiated on host servers according to the determined placement. As discussed above, because the determined placement ensures powerline diversity (e.g., in addition to other placement criteria), operational resiliency of the volume supported by such replicas 204 and nodes 206 is increased. More specifically, should an independent power supply 320 supplying power to a portion of the volume's supporting elements (e.g., some subset of replicas 204 and nodes 206), the failure of that independent power supply 320 would not alone render the volume inaccessible. Thus, power diverse placement of replicas 204 and nodes 206 results in more reliable operation of hosted block storage devices.

Figure 6:
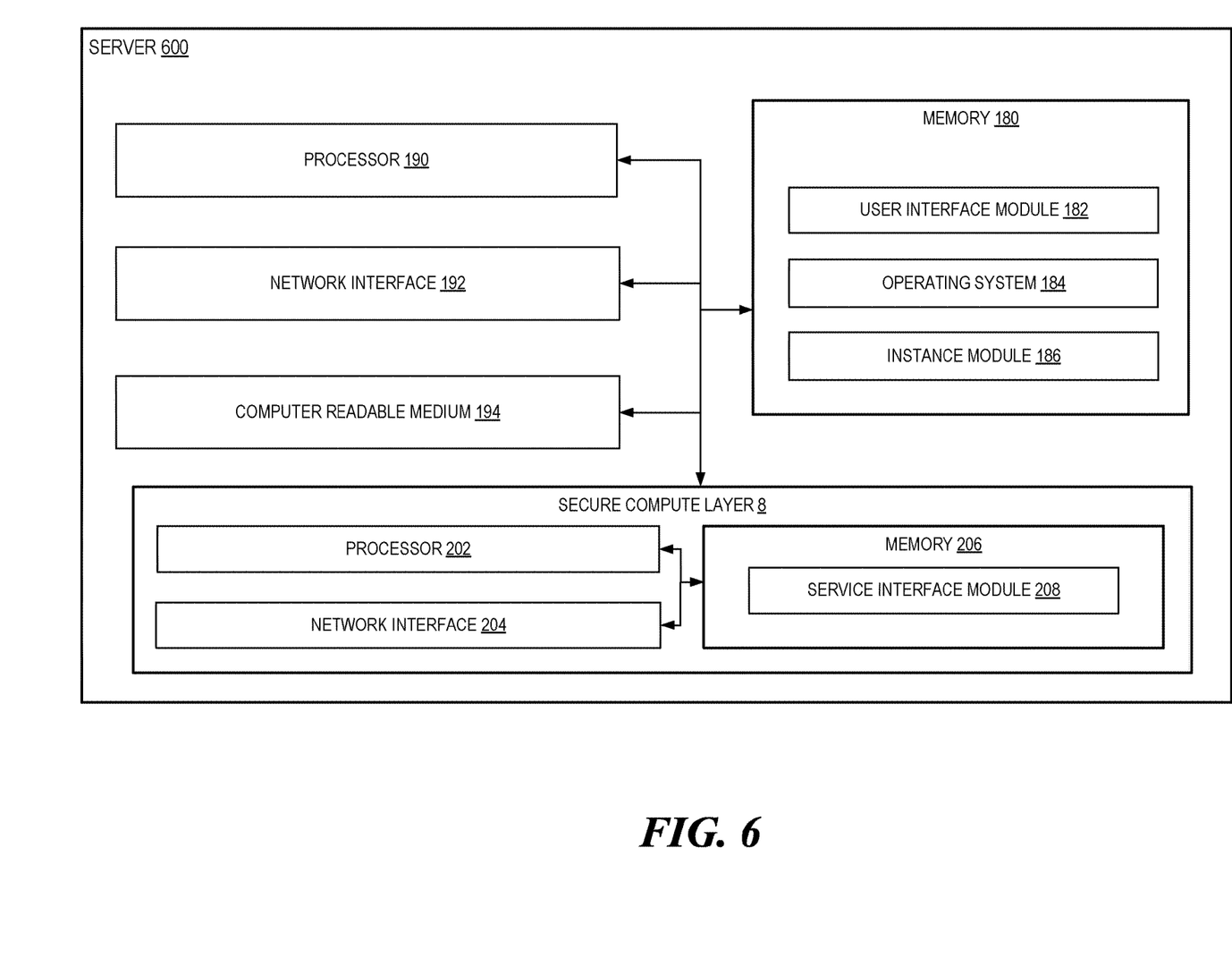
FIG. 6 depicts an example architecture of a server that can be used to perform one or more of the techniques described herein or illustrated in FIGS. 1-5.

FIG. 6 depicts an example architecture of a server 600 that can be used to perform one or more of the techniques described herein or illustrated in FIGS. 1-5. The general architecture of the server 600 depicted in FIG. 6 includes an arrangement of computer hardware and software modules that may be used to implement one or more aspects of the present disclosure. The server 600 may include many more (or fewer) elements than those shown in FIG. 6. It is not necessary, however, that all of these elements be shown in order to provide an enabling disclosure. As illustrated, the server 600 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the networks illustrated in FIGS. 1 and 3.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the host device 5. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module 186 represented code executable to host virtual machine instance, which may utilize components of the server 600 (e.g., the processor 190, network interface 192, etc.) as virtualized hardware supporting execution of that instance.

As discussed above, such an instance (or other software executing within memory 180, particularly in the case of a "bare metal" instance) may thereafter interact with network-accessible services via interaction with the secure compute layer 202. As shown in FIG. 6, the secure compute layer 202 can include hardware isolated from other hardware of the server 600. For example, the secure compute layer 202 may be implemented as an expansion card of the server 600. The secure compute layer 202 can thus include a processor 602, network interface 604, and memory 606 that functions similarly to but is distinct from the respective processor 190, network interface 192, and memory 180 discussed above. The memory 606 illustratively includes a service interface module 608 executable to implement aspects of the present disclosure, e.g., accepting input/output to one or more virtualized block storage devices, translating such requests to network calls, obtaining results of such calls and returning the results as response to an instance.

While FIG. 6 is depicted as a server 600 (e.g., corresponding to servers 303, 305, and 307 of FIG. 3), a similar device may be used to implement other elements of FIGS. 1-3. For example, a device having a similar configuration when programmed with appropriate modules may be used to implement compute servers 115, block store servers 105, or object storage servers 110.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for powerline-diverse placement of elements supporting operation of hosted block storage volumes, wherein the elements supporting operation of an individual hosted block storage volume comprise at least two replicas independently storing data of the individual hosted block storage volume and at least three replicated authority nodes designating a replica, of the at least two replicas, as a primary replica, the system comprising:
    a data center including:
        a plurality of servers configured to host elements supporting operation of the hosted block storage volumes; and
        at least three independent power supplies supplying power to the plurality of servers, wherein a first subset of servers within the plurality of servers is powered by a first independent power supply of the at least three independent power supplies, wherein a second subset of servers within the plurality of servers is powered by a second independent power supply of the at least three independent power supplies, and wherein a third subset of servers within the plurality of servers is powered by a third independent power supply of the at least three independent power supplies; and
    a computing device comprising a processor and configured to:
        obtain a request to place elements supporting operation of a new hosted block storage volume among the plurality of servers;
        determine a placement, among the plurality of servers, of at least two replicas for the new hosted block storage volume and of at least three replicated authority nodes for the new hosted block storage volume, wherein:
            the at least two replicas for the new hosted block storage volume are configured to independently store data of the new hosted block storage volume,
            the at least three replicated authority nodes for the new hosted block storage volume are configured to store data designating a replica, of the at least two replicas for the new hosted block storage volume, as a primary replica, and
            the placement divides the at least two replicas for the new hosted block storage volume among servers powered by at least two different independent power supplies of the at least three independent power supplies and divides the at least three replicated authority nodes for the new hosted block storage volume among servers powered by at least three different independent power supplies of the at least three independent power supplies; and
        initialize the new hosted block storage volume by initializing the at least two replicas for the new hosted block storage volume and the at least three replicated authority nodes for the new hosted block storage volume on the plurality of servers according to the determined placement.

2. The system of claim 1, wherein accessibility of the new hosted block storage volume requires that at least one of the at least two replicas and at least a quorum of the at least three replicated authority nodes be accessible via a network, and wherein the placement results in powerline diversity that ensures a failure of an individual power supply of the at least three independent power supplies does not render the new hosted block storage volume inaccessible.

3. The system of claim 1, wherein the at least three independent power supplies each have at least one source of power that is independent from all other independent power supplies.

4. The system of claim 3, wherein the at least one source of power is at least one of a generator, a battery backup, or an uninterruptable power supply (UPS).

5. A computer-implemented method comprising:
    obtaining a request to place elements supporting operation of a hosted block storage volume among a plurality of servers of a hosted computing environment, wherein the elements supporting operation of the hosted block storage volume include:
        at least two replicas for the hosted block storage volume that are configured to independently store data of the hosted block storage volume, and
        at least three replicated authority nodes for the hosted block storage volume that are configured to store data designating a replica, of the at least two replicas, as a primary replica;
    determining a placement, among the plurality of servers, of the at least two replicas and of the at least three replicated authority nodes, wherein the placement divides the at least two replicas among servers powered by at least two different independent power supplies and divides the at least three replicated authority nodes among servers powered by at least three different independent power supplies; and
    initializing the hosted block storage volume by initializing the at least two replicas and the at least three replicated authority nodes on the plurality of servers according to the determined placement.

6. The computer-implemented method of claim 5, wherein the at least three independent power supplies each have at least one source of power that is independent from all other independent power supplies, and wherein at least two of the at least three independent power supplies share a common source of power different from the at least one source of power.

7. The computer-implemented method of claim 6, wherein the common source of power is a municipal power source, and wherein the at least one source of power is a backup power source that provides power during failure of the municipal power source.

8. The computer-implemented method of claim 5, wherein the at least three replicated authority nodes are configured to designate the primary replica by formation of a quorum, and wherein the placement divides the at least three replicated authority nodes among servers powered by at least three different independent power supplies such that failure of replicated authority nodes serviced by an individual independent power supply of the at least three different independent power supplies does not prevent formation of the quorum among remaining replicated authority nodes.

9. The computer-implemented method of claim 5, wherein the placement is further determined based at least in part on an operational status of the plurality of servers.

10. The computer-implemented method of claim 9, wherein the operational status includes a load of computing resource usage on individual servers of the plurality of servers.

11. The computer-implemented method of claim 5, wherein the placement is further determined based at least in part on an operational status of the at least two independent power supplies.

12. The computer-implemented method of claim 5, wherein the placement is further determined based at least in part on a network topology of a network joining the plurality of servers.

13. The computer-implemented method of claim 5, wherein the placement is further determined based at least in part on a physical placement of the plurality of servers in a data center.

14. One or more non-transitory computer-readable media comprising computer-executable instructions that, when executed by a computing device associated with hosted computing environment comprising a plurality of servers, cause the computing device to:
- obtain a request to place elements supporting operation of a hosted block storage volume among a plurality of servers of a hosted computing environment, wherein the elements supporting operation of the hosted block storage volume include:
  - at least two replicas for the hosted block storage volume that are configured to independently store data of the hosted block storage volume, and
  - at least three replicated authority nodes for the hosted block storage volume that are configured to store data designating a replica, of the at least two replicas, as a primary replica;
- determine a placement, among the plurality of servers, of the at least two replicas and of the at least three replicated authority nodes, wherein the placement divides the at least two replicas among servers powered by at least two different independent power supplies and divides the at least three replicated authority nodes among servers powered by at least three different independent power supplies; and
- initialize the hosted block storage volume by initializing the at least two replicas and the at least three replicated authority nodes on the plurality of servers according to the determined placement.

15. The one or more non-transitory computer-readable media of claim 14, wherein at least one replica of the at least two replicas is partitioned into multiple partitions, and wherein the placement determines a placement of the multiple partitions among the plurality of servers.

16. The one or more non-transitory computer-readable media of claim 14, wherein the placement co-locates at least one replica of the at least two replicas and at least one replicated authority node of the at least three replicated authority nodes on an individual server of the plurality of servers.

17. The one or more non-transitory computer-readable media of claim 14, wherein there is no overlap in independent power supplies between the at least two different independent power supplies and the at least three different independent power supplies.

18. The one or more non-transitory computer-readable media of claim 14, wherein the at least three replicated authority nodes are configured to designate the primary replica by formation of a quorum, and wherein the placement divides the at least three replicated authority nodes among servers powered by at least three different independent power supplies such that failure of replicated authority nodes serviced by an individual independent power supply of the at least three different independent power supplies does not prevent formation of the quorum among remaining replicated authority nodes.

19. The one or more non-transitory computer-readable media of claim 14, wherein the placement is further determined based at least in part on an operational status of the plurality of servers.

20. The one or more non-transitory computer-readable media of claim 14, wherein the placement is further determined based at least in part on an operational status of a network joining the plurality of servers.

* * * * *